(12) United States Patent
Wessels et al.

(10) Patent No.: US 10,547,636 B2
(45) Date of Patent: Jan. 28, 2020

(54) METHOD AND SYSTEM FOR DETECTING AND MITIGATING DENIAL-OF-SERVICE ATTACKS

(71) Applicant: VERISIGN, INC., Reston, VA (US)

(72) Inventors: Duane Wessels, Moscow, ID (US); Matt Weinberg, Vienna, VA (US)

(73) Assignee: VERISIGN, INC., Reston, VA (US)

( * ) Notice: Subject to any disclaimer, the term of this patent is extended or adjusted under 35 U.S.C. 154(b) by 204 days.

(21) Appl. No.: 15/392,700

(22) Filed: Dec. 28, 2016

(65) Prior Publication Data
US 2018/0183830 A1    Jun. 28, 2018

(51) Int. Cl.
*H04L 29/06* (2006.01)
*H04L 29/12* (2006.01)

(52) U.S. Cl.
CPC ...... *H04L 63/1458* (2013.01); *H04L 61/1511* (2013.01); *H04L 63/1425* (2013.01)

(58) Field of Classification Search
CPC ............. H04L 63/1458; H04L 63/1511; H04L 63/0227; H04L 63/0236; H04L 63/1416; H04L 63/1425; H04L 29/06931
See application file for complete search history.

(56) References Cited

U.S. PATENT DOCUMENTS

| | | | |
|---|---|---|---|
| 8,261,351 B1* | 9/2012 | Thornewell | H04L 63/1458 709/203 |
| 9,141,789 B1* | 9/2015 | Gerlach | G06F 21/55 |
| 9,325,735 B1* | 4/2016 | Xie | H04L 63/145 |
| 2001/0052007 A1* | 12/2001 | Shigezumi | H04L 29/12066 709/223 |
| 2005/0203875 A1* | 9/2005 | Mohammed | H04L 43/0817 |
| 2005/0259645 A1* | 11/2005 | Chen | H04L 29/12066 370/389 |
| 2006/0010389 A1* | 1/2006 | Rooney | H04L 63/1425 715/736 |
| 2007/0124487 A1* | 5/2007 | Yoshimoto | H04L 29/12066 709/230 |
| 2008/0104182 A1* | 5/2008 | Jimmei | H04L 29/12066 709/206 |

(Continued)

FOREIGN PATENT DOCUMENTS

WO    WO-2011017427 A1 *    2/2011    ......... H04L 61/1511

OTHER PUBLICATIONS

Extended European Search Report dated Mar. 16, 2018, European Application No. 17210930.8, pp. 1-8.

*Primary Examiner* — Sher A Khan
(74) *Attorney, Agent, or Firm* — MH2 Technology Law Group, LLP

(57) ABSTRACT

A method of detecting a DDOS attack is disclosed. The method includes obtaining, at an authoritative DNS server, a plurality of DNS query packets from a plurality of DNS requestors over a communications network; analyzing, by an electronic processor, a set of the plurality of DNS query packets; determining, by an electronic processor, that a subset of the plurality of DNS query packets of the set meets a predetermined threshold for a rate of DNS queries; filtering the plurality of DNS query packets based on the determining to produce a filtered number of DNS query packets; and providing, by the authoritative DNS server, a DNS response for the plurality of DNS query packets that were filtered.

3 Claims, 9 Drawing Sheets

(56) References Cited

U.S. PATENT DOCUMENTS

| | | | |
|---|---|---|---|
| 2008/0120413 A1* | 5/2008 | Mody | G06Q 10/107 709/226 |
| 2008/0162724 A1* | 7/2008 | Hietasarka | H04L 29/12066 709/245 |
| 2009/0313384 A1* | 12/2009 | Baratakke | H04L 29/12066 709/245 |
| 2009/0319659 A1* | 12/2009 | Terasaki | H04L 63/1416 709/224 |
| 2010/0262688 A1* | 10/2010 | Hussain | H04L 63/1433 709/224 |
| 2011/0035469 A1* | 2/2011 | Smith | H04L 61/1511 709/220 |
| 2013/0031626 A1 | 1/2013 | Kim | |
| 2013/0159482 A1* | 6/2013 | Kim | H04L 61/1511 709/222 |
| 2013/0198803 A1* | 8/2013 | Osterweil | H04L 61/1511 726/1 |
| 2013/0268649 A1* | 10/2013 | Kinra | G06F 16/951 709/224 |
| 2013/0332109 A1* | 12/2013 | Luiset | H04L 63/1441 702/179 |
| 2014/0344925 A1* | 11/2014 | Muthiah | H04L 61/1511 726/22 |
| 2016/0065535 A1* | 3/2016 | O'Leary | G06F 16/248 707/728 |
| 2016/0080262 A1* | 3/2016 | Crasta | H04L 61/1511 709/238 |
| 2016/0261502 A1* | 9/2016 | Donovan | H04L 47/12 |
| 2016/0294773 A1* | 10/2016 | Yu | H04L 63/1425 |
| 2016/0373409 A1* | 12/2016 | Zhu | H04L 61/1511 |
| 2017/0295196 A1* | 10/2017 | Arnell | H04L 69/40 |

\* cited by examiner

METHOD AND SYSTEM FOR DETECTING AND MITIGATING DENIAL-OF-SERVICE ATTACKS

FIELD

The present application is directed to the field of network communication; and more specifically, to detecting and mitigating denial-of-service (DoS) attacks.

BACKGROUND

The original design of the Domain Name System (DNS) protocol and its primary use of the User Datagram Protocol (UDP) for transport leave it vulnerable to use in Denial of Service (DoS) and Distributed Denial of Service (DDoS) attacks. The term DoS will be used herein to denote both types of attacks. In such attacks, name servers may be the intended target, or may be used as a reflection point to harm a third-party. In both cases, source IP addresses are often spoofed. DoS attacks can be characterized by the intention of the attacker to disrupt the operation of the victim, by starving it of computer resources or preventing other legitimate users from reaching the victim's servers by depleting its resources (such as bandwidth, CPU cycles, memory). DoS attacks have an enormous adverse impact on businesses in particular and are becoming even more prevalent than fast-spreading worms or DNS poisoning, primarily due to the ease of implementation, availability of resources, and difficulty of identification of the attacker, whose profile could range from a single individual seeking peer group recognition, or else is unhappy with an organization, to a group with commercial or cyber-terrorist aims.

Many DoS attack modes over the Internet and such communications systems exploit characteristics and limitations in transmission and routing rules and protocols which govern the delivery of packets over a network. As is well known, these transmission protocols in the network and transport layers include the Internet Protocol (IP), the Internet Control Message Protocol (ICMP) the Transport Control Protocol (TCP) and the User Datagram Protocol (UDP).

TCP is a connection-oriented protocol which enables two hosts to establish a connection to exchange in-sequence data in a reliable manner. This reliability stems in part from the receiver's acknowledging the receipt of packets received in the correct sequence number order, usually by way of an acknowledgment (ACK) packet or message. Furthermore, if an expected packet is not received at the receiver or far end within a reasonable round-trip time, a timer will cause a timeout wherein the expected packet is deemed to be missing. Whenever an expected packet is not received, this will be transmitted by the sending end.

In contrast, UDP is a connectionless transport protocol, which transmits traffic in an unreliable manner over the network. As is known, UDP transmits segments including source and destination ports which define end points within the source and destination machines, which allow for the correct delivery of the segments. No connection setup is required for a UDP transmission, making this protocol a preferred choice for DoS attackers.

While TCP and UDP are transport layer protocols, ICMP functions at the network layer and serves to flag up unusual events and errors in the processing of datagrams within the Internet.

The typical DoS attack mode is to flood the receiver with so much traffic that the victim's resources are consumed in dealing with the maliciously-sent traffic, and there is none left for the receiver's own legitimate functions, causing the receiver's system to operate at a reduced speed or worse, to hang or crash. Network equipment can be overwhelmed in an attack even before the traffic reaches its intended victim, as routers, servers, firewalls and so on would have capacity, memory and other limits which may be stressed by the speed and/or volume of the attack transmission. The flooding traffic can take the form of the use of a high packet rate, the sending of many small packets, and the like. Known variations of flooding attack techniques include SYN floods, ICMP floods, UDP floods and the like, each of which have their own characteristics, but in all cases they involve sending a large amount of data, typically at a high speed, to the victim.

Attacks can be performed either by a single malicious sender, or can be the concerted action of a number of machines in what is known as a DDoS attack. In this case, the concerted action can be controlled by a single, master machine which controls the action of a network "zombies" being computers including a daemon which the master machine uses to launch a flooding DoS attack, or "bots" being client computer programs running in the background which can be controlled by a remote master computer to automatically launch a flooding attack. These sending entities may be hosted on an infected or compromised machine used by a user who is innocent of the malicious flooding traffic emanating from his computer. In such cases, the identity of the sender, e.g., attacker, and/or master computer is also concealed. In yet another variation, the attacker falsifies (or "spoofs") the source address of the attack packets, such that the flood response messages are delivered to a third-party victim.

In more recent attacks, attackers on two occasions spoofed DNS query packets from a wide range of IP addresses. Because of the wide range of these attacks, the rate of packets from a particular source IP address or range of IP address was below the threshold that triggered RRL.

Accordingly, improved DoS techniques that addresses the aforementioned issues are needed.

SUMMARY

According to examples of the present disclosure, a method of detecting a DDOS attack is provided. The method comprises obtaining, at an authoritative DNS server, a plurality of DNS query packets from a plurality of DNS requestors over a communications network; analyzing, by an electronic processor, a set of the plurality of DNS query packets; determining, by an electronic processor, that a subset of the plurality of DNS query packets of the set meets a predetermined threshold for a rate of DNS queries; filtering the plurality of DNS query packets based on the determining to produce a filtered number of DNS query packets; and providing, by the authoritative DNS server, a DNS response for the plurality of DNS query packets that were filtered.

In some examples, the analyzing further comprises determining that one or more fields in the plurality of DNS query packets share a common feature.

In some examples, the one or more fields can comprise an IP header field, a DNS data field, a recursion desired field, and a time-to-live field.

In some examples, the analyzing further comprising time sampling the set of the plurality of DNS query packets to generate the subset of the plurality of DNS query packets.

According to examples of the present disclosure, a method of detecting a DDOS attack is provided. The method comprises obtaining a plurality of DNS query packets from a plurality of DNS requestors from one or more authoritative DNS servers; analyzing, by an electronic processor, a set of the plurality of DNS query packets; determining, by an electronic processor, that a subset of the plurality of DNS query packets of the set meets a predetermined threshold; and providing a result of the determining to a filtering mechanism of each of the one or more authoritative DNS servers.

In some examples, the analyzing further comprises determining that one or more fields in the plurality of DNS query packets share a common feature. In some examples, the one or more fields can comprise an IP header field, a DNS data field, and a recursion desired field.

According to examples of the present disclosure, a system is provided that comprises one or more processors; and a memory system comprising one or more non-transitory computer-readable media storing instructions that, when executed by at least one of the one or more processors, cause the one or more processors to perform a method of detecting a DDOS attack, the method comprising: obtaining a plurality of DNS query packets from a plurality of DNS requestors over a communications network; analyzing, by the one or more processors, a set of the plurality of DNS query packets; determining, by the one or more processors, that a subset of the plurality of DNS query packets of the set meets a predetermined threshold for a rate of DNS queries; filtering the plurality of DNS query packets based on the determining to produce a filtered number of DNS query packets; and providing a DNS response for the plurality of DNS query packets that were filtered. In some examples, the analyzing further comprises determining that one or more fields in the plurality of DNS query packets share a common feature. In some examples, the one or more fields can comprise an IP header field, a DNS data field, a recursion desired field, and a time-to-live field. In some examples, the analyzing further comprising time sampling the set of the plurality of DNS query packets to generate the subset of the plurality of DNS query packets.

In some examples, the analyzing further comprises maintaining a count of the plurality of DNS query packets.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
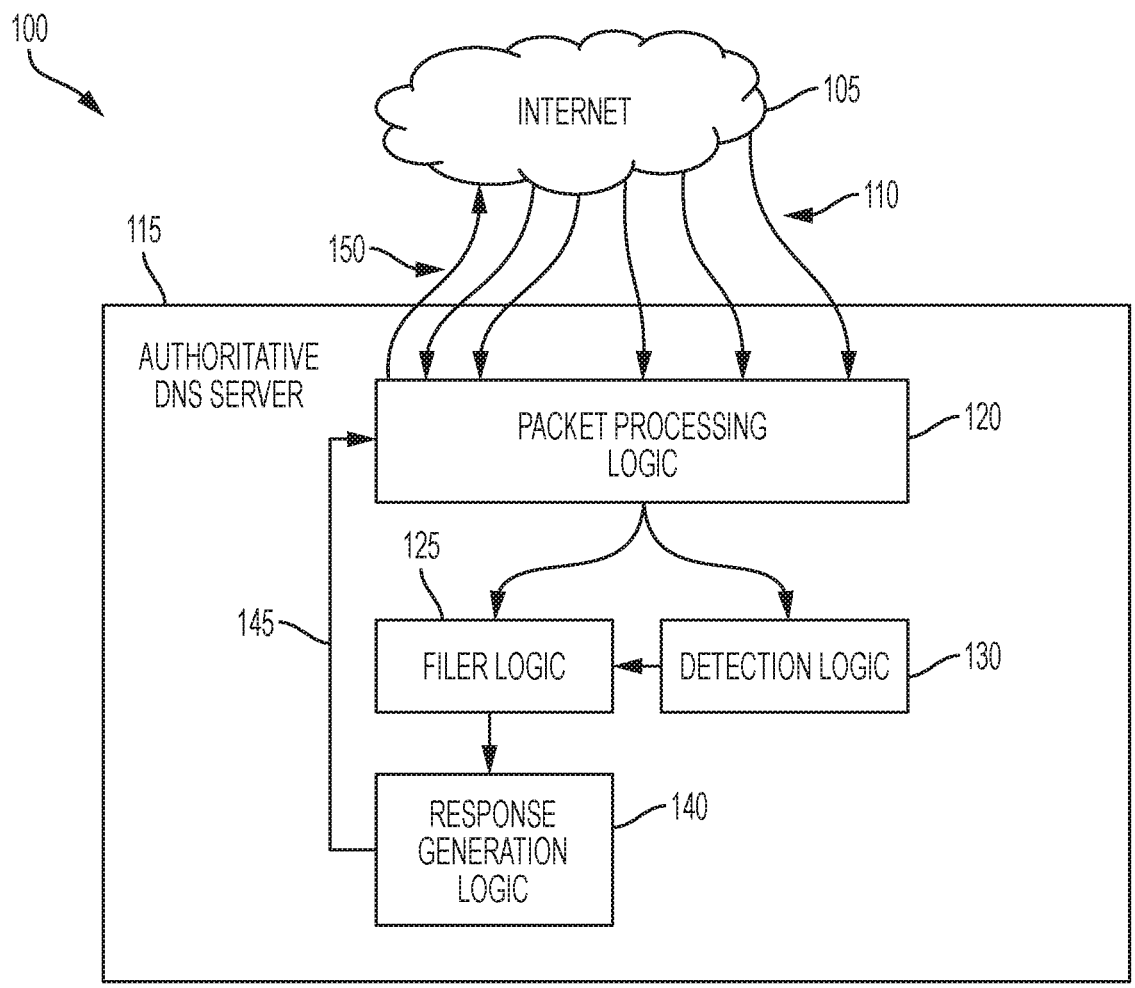
FIG. 1 is a first example diagram illustrating a system for detecting and mitigating a DoS attack, according to examples of the present disclosure.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

The disclosed examples provide for the automatic detection of an attack from a large number of spoofed sources. One example of the disclosure involves counting the number of unique source IP addresses observed over a certain period of time. Such counting might be implemented using a traditional computing data structure such as a hash table, or a bloom filter. Generally, such data structures have resource requirements (processor, memory) that could impact the performance of a service. It may be desirable to implement the detection of the attack externally from the services it protects (e.g. in separate processes or servers). According to the disclosed examples, the following business benefits are provided in the event of an attack: Protects other business products running on shared infrastructure (increased stability); Improves operational intelligence, for example, on the nature and scale of an attack; Improves time to respond to and mitigate an attack (competitive advantage, decreased costs).

FIG. 1 is a diagram illustrating an example system 100 for detecting and mitigating a DoS attack, according to examples of the present disclosure. In one example, the system 100 is part of an authoritative DNS server 115 and is used for detecting spoofed DNS query packets or the like that appear to the receiving entity to originate from a first transmitting entity but actually originate from a second transmitting entity that has falsified data (e.g., used a falsified IP address). The authoritative DNS server 115 receives a plurality of DNS query packets 110 from a plurality of transmitting entities (not shown) at packet processing logic 120. Packet processing logic 120 copies each DNS query packet and provides each packet to a filter logic 125 and a detection logic 130. The detection logic 130 can perform one or more analytic techniques to determine if a DoS attack is occurring. By way of one example, the detection logic 130 can determine and maintain a count of a number of queries over time. On an ongoing basis, periodically (every several of seconds or minutes), or once traffic reaches a predetermined threshold (number of queries exceeds 10 million, 100 million, 500 million, etc.), the detection logic 130 can inspect queries from a sampling of IP addresses to determine if the queries share any common feature that can be used to filter incoming packets.

Figure 2:
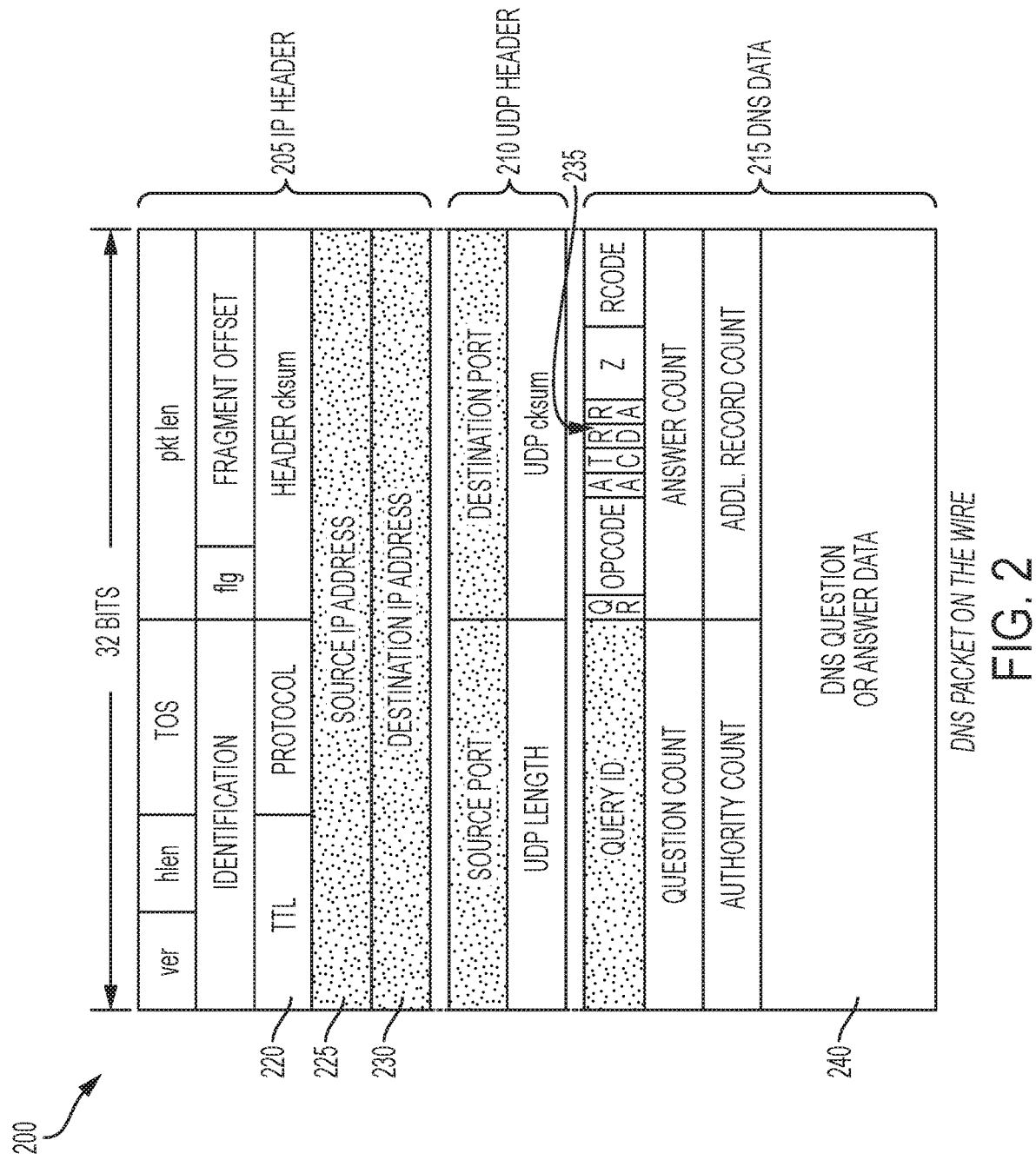
FIG. 2 is an example DNS query packet that can be used with the example systems for detecting and mitigating a DoS attack, according to examples of the present disclosure.

FIG. 2 show a DNS query packet 200 including a number fields that can be used to filter the incoming packets by the filter logic 125 based on the analysis performed by the detection logic 130, according to examples of the present disclosure. The DNS query packet 200 is just one example of a query packet and may include fewer or additional fields than are shown in the figure. The DNS query packet 200 includes an IP header section 205, UDP header section 210, and a DNS data section 215. In one example, the detection logic 130 can analyze the query packets to look for commonalities in one or more of: TTL (time-to-live) field 220, which is a mode hop value that is decreased each time the query packet is processed by a network element, i.e., internet service provider (ISP), router, gateway, etc.; source IP address field 225; destination IP address field 230; recursion desired (RD) bit field 235; and DNS question or answer data field 240. Other data fields of the DNS query packet 200 can also be analyzed by the detection logic 130 to determine commonalities between query packets.

Figure 3:
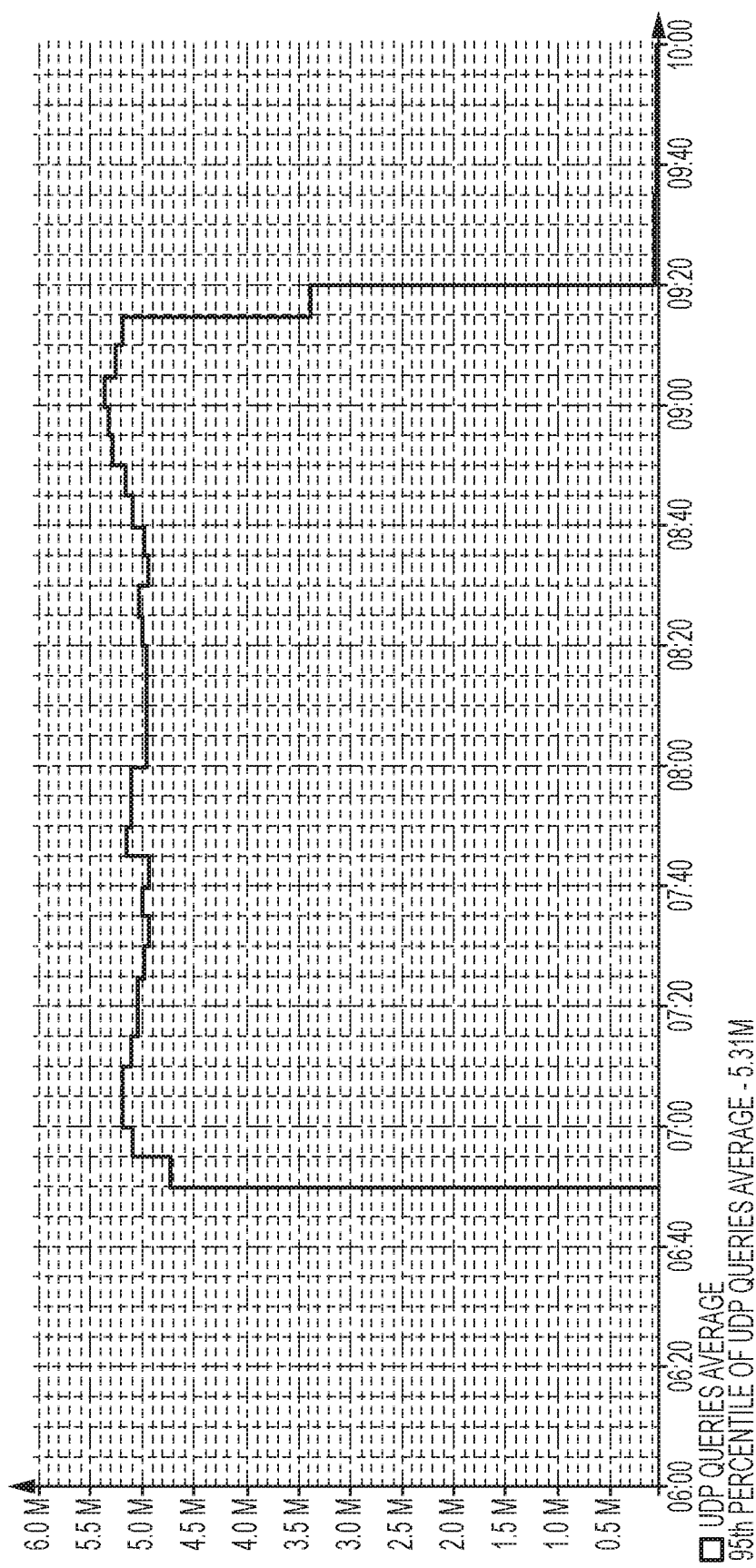
FIG. 3 is an example chart of a number DNS queries over time that shows an increase during a DoS attack, according to examples of the present disclosure.
Figure 4:
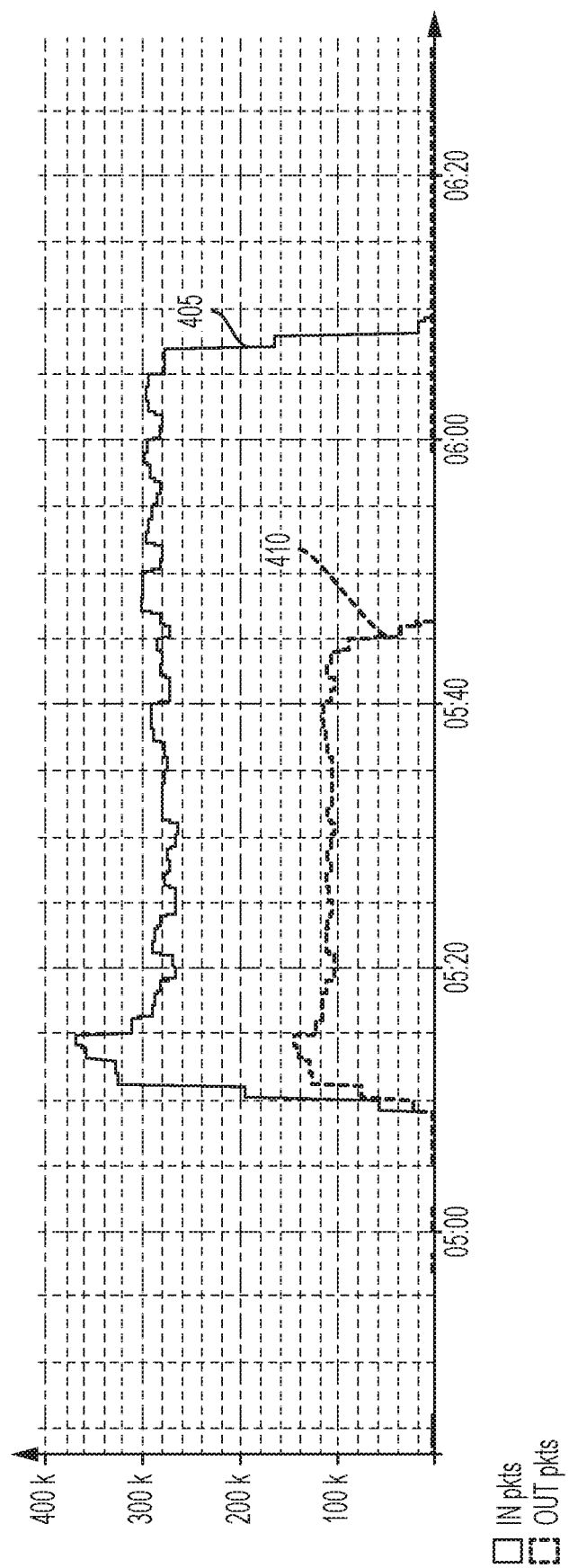
FIG. 4 is an example chart of a number DNS queries over time that shows the results of the filtering by the example system for detecting and mitigating a DoS attack, according to examples of the present disclosure.

FIG. 3 shows a chart of number of query request over time for an example DoS attack that can be counted, maintained, and analyzed by the detection logic 130, according to examples of the present disclosure. This example shows a DoS attack where the increased traffic was seen between 6:50 and 9:20. The detection logic 130 can determine, at a time interval subsequent to 6:50 when the traffic suddenly increased, that a DoS attack has commenced. Once this determination is made, the detection logic 130 can begin analyzing the queries to determine if there are any commonalities in the DNS query packets. In one example, if a number of DNS query packets have the same TTL value or range of TTL values, the same source IP address, the same destination IP address, the same RD bit value, the same DNS question or answer data as determined by the detection logic 130, then is data is provided to filter logic 125 where a filter can be selected or constructed by the filter logic 125 to filter out those queries. In one example, if a number of DNS query packets share the same RD bit value, the same or range of TTL values, and the same DNS question or answer data as determined by the detection logic 130, then the detection logic 130 provides this data to the filter logic 125 to select or construct a filter with these parameters. FIG. 4 show a chart of number of query request and filtered queries over time for an example DoS attack, according to examples of the present disclosure. As shown in FIG. 4, the number of queries received by the detection logic 130 can be reduced from the line indicated by 405 to the line indicated by 410 by applying an appropriate filter by the filter logic 125.

Once the queries have been filtered by the filter logic 125, a response generation logic 140 provides response 145 to those queries remaining. The responses 145 are provided to the packet processing logic 120 where the responses are formatted. The formatted response 150 can then be provided to the appropriate transmitting entities over the internet 105. As a result, the authoritative DNS server 115 provides response to those transmitting entities that have their DNS query packets pass through the filter logic 125, which reduces the computational resources, i.e., bandwidth, CPU cycles, etc., that would otherwise be used to respond to DoS attack traffic.

Once the detection logic 130 determines that the DoS attack has ended by determining that the increased query traffic has ended, as shown at 9:20 in FIG. 3, the filter applied by the filter logic 125 can be deactivated and the response generation logic 140 can generate responses for each DNS query packets 110.

Figure 5:
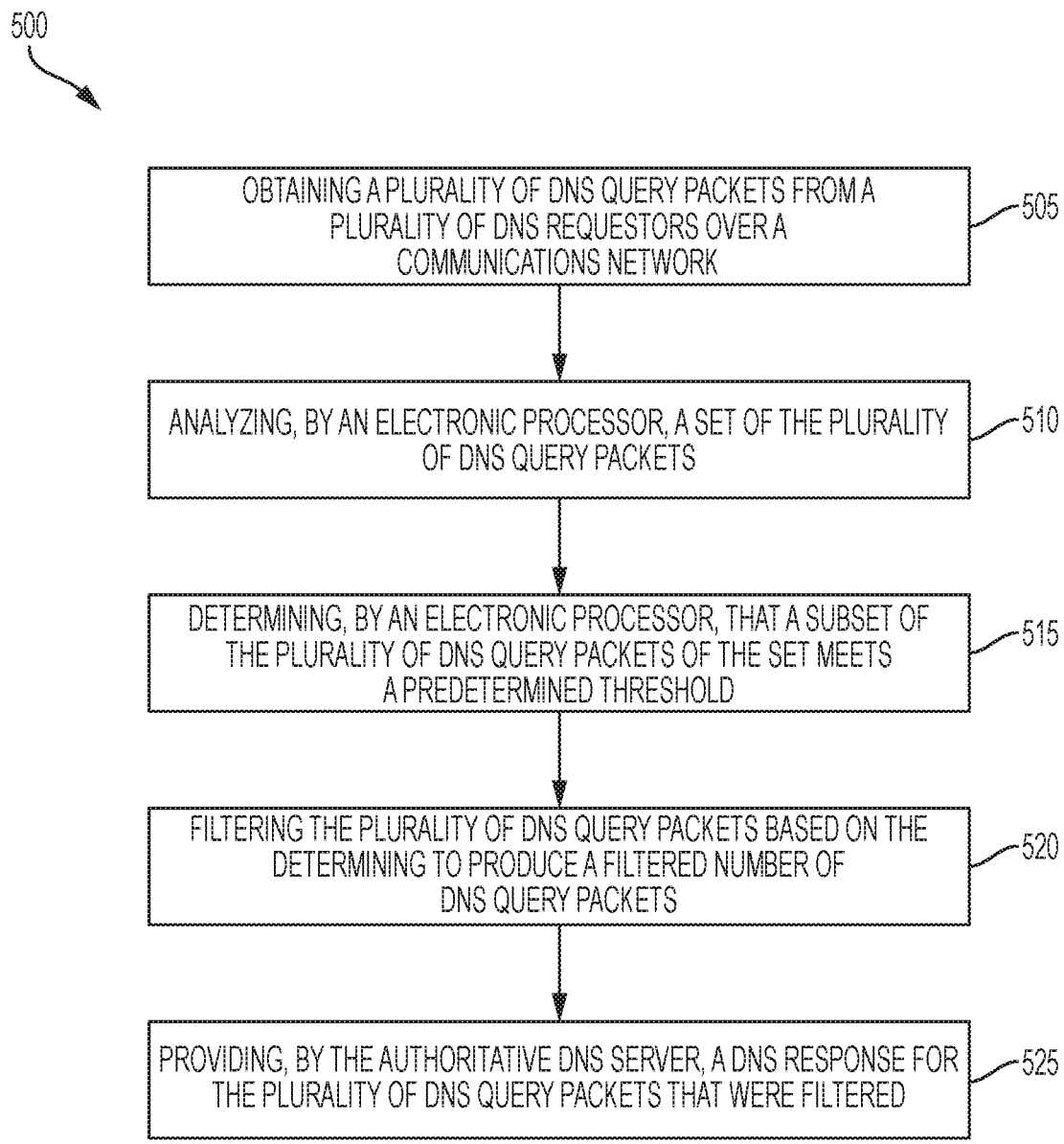
FIG. 5 is an example method for detecting and mitigating a DoS attack using the system of FIG. 1, according to examples of the present disclosure.

FIG. 5 is a flow diagram illustrating an example method for detecting a DoS attack, according to examples of the present disclosure. The method 500 described in FIG. 5 can be performed using the authoritative DNS server 115 from FIG. 1. The method 500 may begin in 505, where an authoritative DNS server obtains a plurality of DNS query packets from a plurality of DNS requestors over a communications network. For example, the authoritative DNS server 115 obtains a plurality of DNS query packets 110 over a network, such the internet 105, from a plurality of transmitting entities (not shown). At 510, an electronic processor of the authoritative DNS server analyzes a set of the plurality of DNS query packets. Continuing with this example, the electronic processor can execute the detection logic 130 to perform the one or more analytic techniques discussed above to determine if a DoS attack is occurring. The one or more analytic techniques determines that one or more fields in the plurality of DNS query packets share a common feature. The one or more fields can include, but are not limited to, an IP header field, a DNS data field, a recursion desired field, and a time-to-live field. For example, in order to trigger an attack, the detection logic 130 can analyze a plurality of DNS query packets to determine how many packets share common data or how many fields with the DNS query packet share common data, or both. For example, if 100 packets share one field in common or 100 packets share at least three field in common, or both. The detection logic 130 can continuously sample, or sample during a predetermined time interval, the DNS query packets across the IP address space or a subset of the IP space. At 515, an electronic processor of the authoritative DNS server 115 determines that a subset of the plurality of DNS query packets 110 of the set meets a predetermined threshold. Continuing with this example, if the detection logic 130 determines that the number of DNS query packets has reached a predetermined threshold level, the detection logic 130 can analyze the DNS query packets to determine that one or more features are common between the DNS query packets, such as the same TTL value 220, RD bit value 235, and DNS question or answer data 240. At 520, an electronic processor of the authoritative DNS server filters the plurality of DNS query packets based on the determining to produce a filtered number of DNS query packets. Continuing with the example, the detection logic 130 can then provide the common features to the filter logic 125, where the filter logic 125 selects or constructs a filter to be used to filter the DNS query packets. The DNS query packets that are filtered can then be selected to have the response generation logic 140 to produce a response for those filtered DNS query packets. The remaining DNS query packets are filtered out and the response generation logic 140 does not provide response to those DNS query packets. In this example, DNS query packets that have the same TTL value 220, RD bit value 235, and DNS question or answer data 240 and are filtered by the filter logic 125. At 525, the authoritative DNS server 115 provides a DNS response 145, 150 for the plurality of DNS query packets that were filtered.

Figure 6:
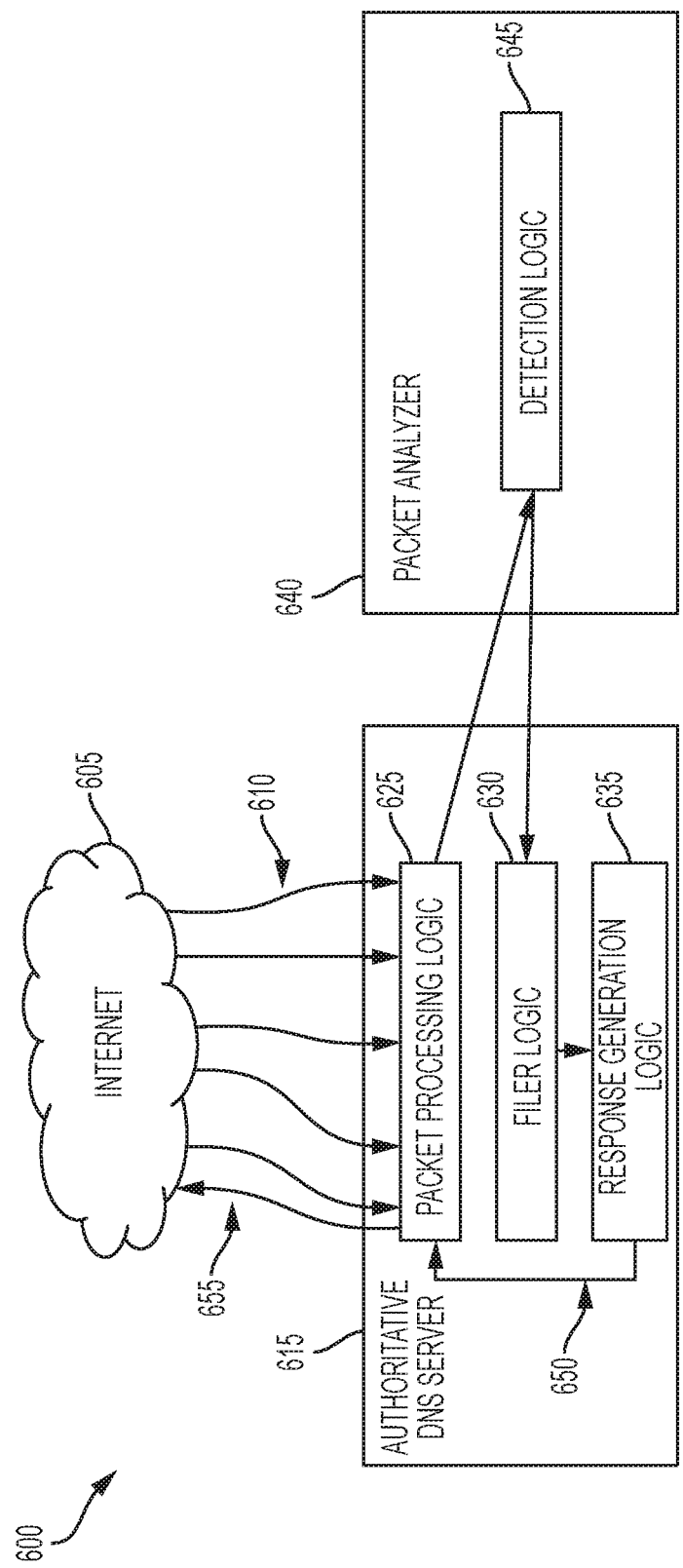
FIG. 6 is a second example diagram illustrating a system for detecting and mitigating a DoS attack, according to examples of the present disclosure.

FIG. 6 is a diagram illustrating another example system 600 for detecting and mitigating a DoS attack, according to examples of the present disclosure. In this example, a packet analyzer 640 includes an detection logic 645, which is similar to the detection logic 130 of FIG. 1, that is separate from an authoritative DNS server 615 and is used for detecting spoofed DNS query packets or the like that appear to the receiving entity to originate from a first transmitting entity but actually originate from a second transmitting entity that has falsified data (e.g., used a falsified IP address). Similar to FIG. 1, the authoritative DNS server 115 receives a plurality of DNS query packets 610 from a plurality of transmitting entities (not shown) at packet processing logic 625. Packet processing logic 625 copies each DNS query packet and provides each packet to a filter logic 630, which is similar to filter logic 125, and the detection logic 645. The detection logic 645 can perform one or more analytic techniques, as discussed with the detection logic 130 to determine if a DoS attack is occurring. Once the queries have been filtered by the filter logic 630, response generation logic 635, which is similar to the response generation logic 140, provides response 650 to those queries remaining. The responses 650 are provided to the packet processing logic 625 and can be formatted. The formatted response 655 can then be provided to the appropriate transmitting entities over the internet 605. As a result, the authoritative DNS server 615 provides response to those transmitting entities that have their DNS query packets pass through the filter logic 630, which reduces the computational resources, i.e., bandwidth, CPU cycles, etc., that would otherwise be used to respond to DoS attack traffic.

Figure 7:
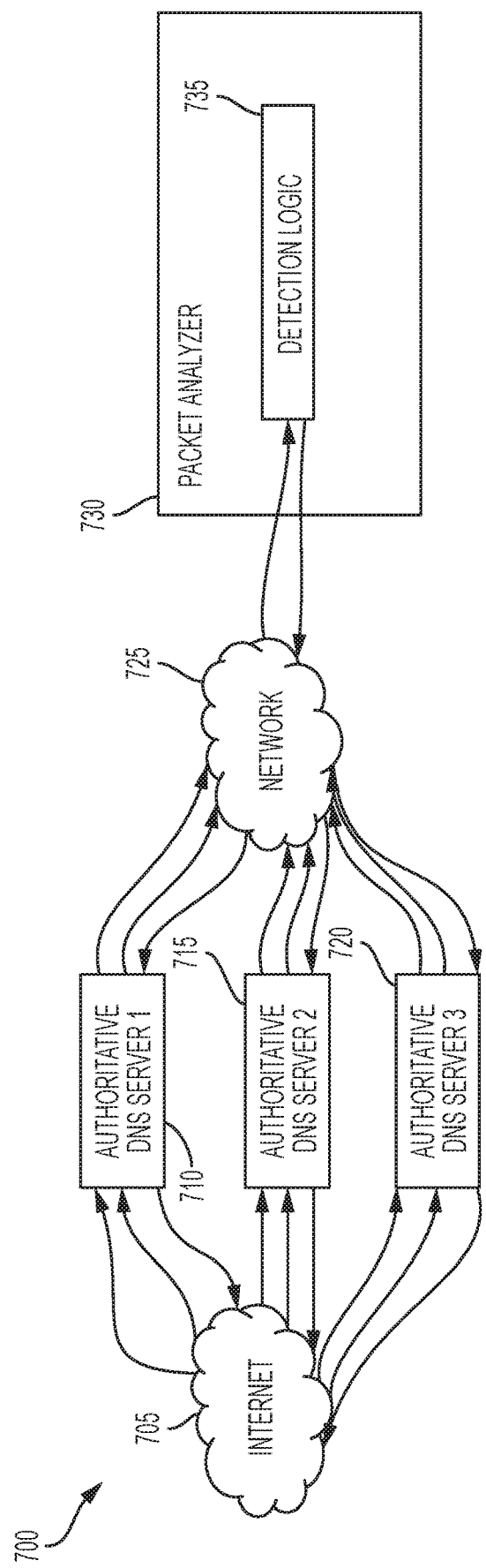
FIG. 7 is third example diagram illustrating a system for detecting and mitigating a DoS attack, according to examples of the present disclosure.

FIG. 7 is a diagram illustrating another example system 700 for detecting and mitigating a DoS attack, according to examples of the present disclosure. In this example, a packet analyzer 730 includes an detection logic 735, which is similar to the detection logic 130 of FIG. 1, that is separate from a plurality of authoritative DNS servers 710, 715, and 720 and is used for detecting spoofed DNS query packets or the like that appear to the receiving entity to originate from a first transmitting entity but actually originate from a second transmitting entity that has falsified data (e.g., used a falsified IP address). Although FIG. 7 shows three DNS authoritative servers communicating with a packet analyzer 730 over a network 725, this is just one example. The packet analyzer 730 can communicate with any number of authoritative DNS servers. This example allows the packet analyzer 730 to analyze packets from a variety of transmitting entities that may allow packet analyzer 730 to determine commonalities in DNS query packets that may not be detected or detected over a longer time frame by analyzing packets from a single authoritative DNS server. Similar to FIG. 1, the authoritative DNS servers 710, 715, and 720 receive a plurality of DNS query packets from a plurality of transmitting entities (not shown) over a network, such as the internet 705. Each authoritative DNS servers 710, 715, and 720, receives a plurality of DNS query packets at a respective packet processing logic, such as the packet processing logic 625, over a network, such as network 725. Each respective packet processing logic of the plurality of the authoritative DNS servers 710, 715, and 720 copies each DNS query packet and provides each packet to a respective filter logic, such as the filter logic 630 and the detection logic 735. The detection logic 735 can perform one or more analytic techniques, as discussed with the detection logic 130 to determine if a DoS attack is occurring. Once the queries have been filtered by the respective filter logic, response generation logic, such as the response generation logic 635, provides responses to those queries remaining.

Figure 8:
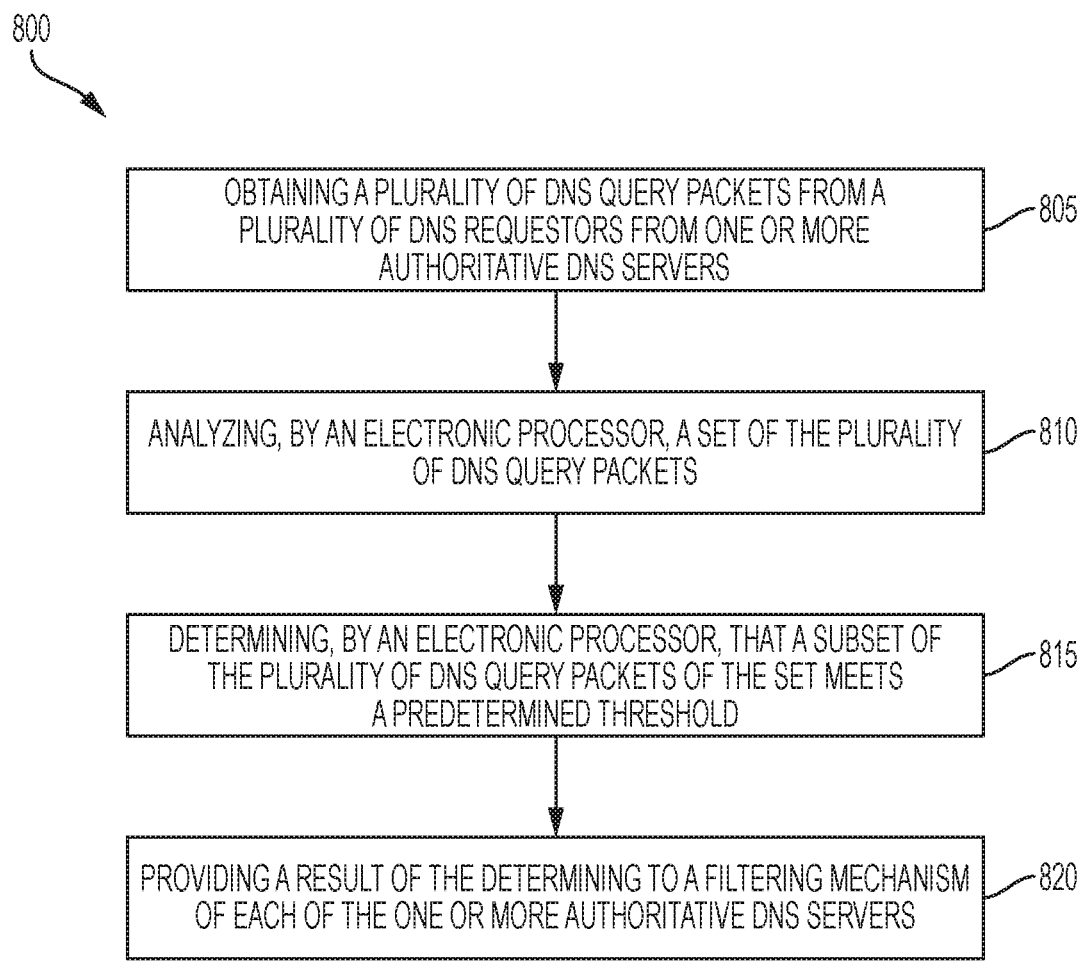
FIG. 8 is an example method for detecting and mitigating a DoS attack using the system of FIG. 6 or 7, according to examples of the present disclosure.

FIG. 8 is a flow diagram illustrating an example method for detecting a DoS attack, according to examples of the present disclosure. The method 800 described in FIG. 8 can be performed using the packet analyzer 640 from FIG. 6 or the packet analyzer 730 from FIG. 7. The method 800 may begin in 805, where the packet analyzer 640, 730 obtains a plurality of DNS query packets from a plurality of DNS requestors from one or more authoritative DNS servers. For example, the packet analyzer 640, 730 obtains a plurality of DNS query packets from one or more authoritative DNS server(s) 615, 710, 715, 720. At 810, an electronic processor of the packet analyzer 640, 730 analyzes a set of the plurality of DNS query packets. Continuing with this example, the electronic processor can execute the detection logic 645, 735 to perform the one or more analytic techniques discussed above to determine if a DoS attack is occurring. The one or more analytic techniques determines that one or more fields in the plurality of DNS query packets share a common feature. The one or more fields can include, but are not limited to, an IP header field, a DNS data field, a recursion desired field, and a time-to-live field. The detection logic 645, 735 can continuously sample, or sample during a predetermined time interval, the DNS query packets across the IP address space or a subset of the IP space. At 815, an electronic processor of the packet analyzer 640, 730 determines that a subset of the plurality of DNS query packets of the set meets a predetermined threshold. Continuing with this example, if the detection logic 645, 735 determines that the number of DNS query packets has reached a predetermined threshold level for a rate of DNS queries, the detection logic 645, 735 can analyze the DNS query packets to determine that one or more features are common between the DNS query packets, such as the same TTL value 220, RD bit value 235, and DNS question or answer data 240. At 820, an electronic processor of the packet analyzer 640, 735 provides a result of the determining to a filtering logic of each of the one or more authoritative DNS server(s) 615, 710, 715, 720.

Figure 9:
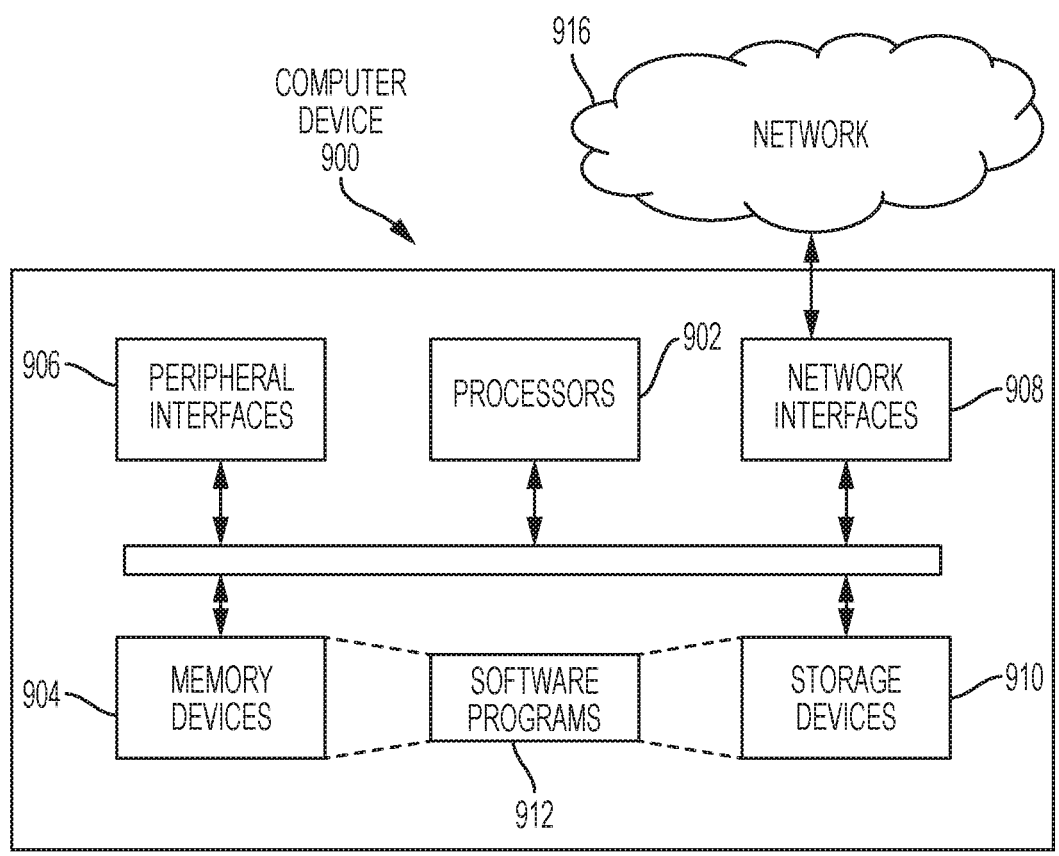
FIG. 9 is a diagram illustrating an example of a hardware system for performing at least a portion of one or more of the methods disclosed herein, according to examples of the present disclosure.

FIG. 9 illustrates an example of a hardware configuration for computer device 900 that can be used as mobile device or server, which can be used to perform one or more of the processes described above. While FIG. 9 illustrates various components contained in computer device 900, FIG. 9 illustrates one example of a computer device and additional components can be added and existing components can be removed.

Computer device 900 can be any type of computer devices, such as desktops, laptops, servers, DNS server, etc., or mobile devices, such as smart telephones, tablet computers, cellular telephones, personal digital assistants, etc. As illustrated in FIG. 9, computer device 900 can include one or more processors 902 of varying core configurations and clock frequencies. Computer device 900 can also include one or more memory devices 904 that serve as a main memory during the operation of computer device 900. For example, during operation, a copy of the software that supports the DNS operations and packet analyzer can be stored in one or more memory devices 904. Computer device 900 can also include one or more peripheral interfaces 906, such as keyboards, mice, touchpads, computer screens, touchscreens, etc., for enabling human interaction with and manipulation of computer device 900.

The computer device 900 can also include one or more network interfaces 908 for communicating via one or more networks, such as Ethernet adapters, wireless transceivers, or serial network components, for communicating over wired or wireless media using protocols. The computer device 900 can also include one or more storage device 910 of varying physical dimensions and storage capacities, such as flash drives, hard drives, random access memory, etc., for storing data, such as images, files, and program instructions for execution by one or more processors 902.

Additionally, computer device 900 can include one or more software programs 912 that enable the functionality described above. One or more software programs 912 can include instructions that cause one or more processors 902 to perform the processes described herein. Copies of one or more software programs 912 can be stored in one or more memory devices 904 and/or on in one or more storage devices 910. Likewise, the data, for example, the DNS data and packet analysis data utilized by one or more software programs 912 can be stored in one or more memory devices 904 and/or on in one or more storage devices 910.

In implementations, computer device 900 can communicate with other devices via network 916. The other devices can be any types of devices as described above. Network 916 can be any type of electronic network, such as a local area network, a wide-area network, a virtual private network, the Internet, an intranet, an extranet, a public switched telephone network, an infrared network, a wireless network, and any combination thereof. Network 916 can support communications using any of a variety of commercially-available protocols, such as TCP/IP, UDP, OSI, FTP, UPnP, NFS, CIFS, AppleTalk, and the like.

Computer device 900 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of computer device 900 as described above need not be enclosed within a single enclosure or even located in close proximity to one another. Those skilled in the art will appreciate that the above-described componentry are examples only, as computer device 900 can include any type of hardware componentry, including any necessary accompanying firmware or software, for performing the disclosed implementations. Computer device 900 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method of detecting a distributed denial of service (DDOS) attack, the method comprising:
   obtaining, at an authoritative domain name system (DNS) server, a plurality of DNS query packets from a plurality of DNS requestors over a communications network;
   analyzing, by an electronic processor, a set of the plurality of DNS query packets to determine a count of unique source IP addresses in the plurality of DNS query packets over a predetermined period of time;
   in response to the count reaching a predetermined threshold, determining that one or more fields in the set of the plurality of DNS query packets share a common feature, wherein the one or more fields comprise at least one or more of: a DNS data field, a recursion desired field, or a time-to-live field;
   maintaining a count of the plurality of DNS query packets;
   time sampling the set of the plurality of DNS query packets to generate a subset of the plurality of DNS query packets;
   determining, by an electronic processor, that the subset of the plurality of DNS query packets of the set that share the common feature meets a predetermined threshold for a rate of DNS queries;
   filtering the plurality of DNS query packets based on the determining to produce a filtered number of DNS query packets; and
   providing, by the authoritative DNS server, a DNS response for the plurality of DNS query packets that were filtered.

2. A method of detecting a distributed denial of service (DDOS) attack, the method comprising:
   obtaining a plurality of domain name system (DNS) query packets from a plurality of DNS requestors from one or more authoritative DNS servers;
   analyzing, by an electronic processor, a set of the plurality of DNS query packets to determine a count of unique source IP addresses in the plurality of DNS query packets over a predetermined period of time;
   in response to the count reaching a predetermined threshold, determining that one or more fields in the set of the plurality of DNS query packets share a common feature, wherein the one or more fields comprise at least one or more of: a DNS data field, a recursion desired field, or a time-to-live field;
   maintaining a count of the plurality of DNS query packets;
   time sampling the set of the plurality of DNS query packets to generate a subset of the plurality of DNS query packets;
   determining, by an electronic processor, that the subset of the plurality of DNS query packets of the set that share the common feature meets a predetermined threshold; and
   providing a result of the determining to a filtering mechanism of each of the one or more authoritative DNS servers.

3. A system comprising:
   one or more processors; and
   a memory system comprising one or more non-transitory computer-readable media storing instructions that are executed by at least one of the one or more processors, to cause the one or more processors to perform a method of detecting a distributed denial of service (DDOS) attack, the method comprising:
   obtaining a plurality of domain name system (DNS) query packets from a plurality of DNS requestors over a communications network;
   analyzing, by the one or more processors, a set of the plurality of DNS query packets to determine a count of unique source IP addresses in the plurality of DNS query packets over a predetermined period of time;
   in response to the count reaching a predetermined threshold, determining that one or more fields in the set of the plurality of DNS query packets share a common feature, wherein the one or more fields comprise at least one or more of: a DNS data field, a recursion desired field, or a time-to-live field;
   maintaining a count of the plurality of DNS query packets;
   time sampling the set of the plurality of DNS query packets to generate a subset of the plurality of DNS query packets;
   determining, by the one or more processors, that the subset of the plurality of DNS query packets of the set that share the common feature meets a predetermined threshold for a rate of DNS queries;
   filtering the plurality of DNS query packets based on the determining to produce a filtered number of DNS query packets; and
   providing a DNS response for the plurality of DNS query packets that were filtered.

* * * * *